INVENTORS
RICHARD W. AHRONS,
LESLIE L. BURNS, JR
& LOREN B. JOHNSTON
BY Charles H. Brown
ATTORNEY

TELEVISION BRIGHTNESS AND CONTROL CIRCUIT

Filed April 1, 1959

2 Sheets-Sheet 2

INVENTORS.
RICHARD W. AHRONS,
LESLIE L. BURNS &
LOREN B. JOHNSTON
BY Charles H. Brown
ATTORNEY United States Patent Office 3,009,989
Patented Nov. 21, 1961

3,009,989
TELEVISION BRIGHTNESS AND CONTROL CIRCUIT

Richard W. Ahrons, Somerville, and Leslie L. Burns, Jr., and Loren B. Johnston, Princeton, N.J., assignors to Radio Corporation of America, a corporation of Delaware Filed Apr. 1, 1959, Ser. No. 803,522
8 Claims. (Cl. 178—5.4)

This invention relates to an automatic system for controlling the brightness and contrast of the image reproduced by a television image reproducing device.

In order to make the description of the invention that follows clear, it should be kept in mind that by contrast control is meant the control, which is generally on a television receiver or monitor, that principally controls the amount of peak-to-peak video signal applied to the image reproducing device. Similarly, the brightness control operates to vary the amount of direct current (D.C.) voltage in the signal that is applied to the image reproducing device. Because the low level or dark portions of the picture are particularly sensitive to the absolute level at which they occur, the brightness control is often referred to as a background control.

Brightness and contrast controls are generally included on a television receiver, for example, primarily to enable the viewer to correct for program and station differences as well as aging of the receiver components. Program differences, created for example by very poor gray scale rendition (resulting when old movies are being viewed), may be corrected to some extent by variation of the brightness and contrast settings of a television receiver. Since some television transmitting stations operate with more "set up," some adjustment of the brightness control on the old television receiver is often required to obtain a suitable background of the reproduced image. Also, some stations tend to modulate at a higher level than others which requires a suitable adjustment of the contrast control.

Although brightness and contrast controls are useful, the average viewer does not understand these controls sufficiently to enable him to obtain an optimum picture except by a process of trial and error. Both the contrast and brightness controls interact with each other to the extent that each affects the operation of the other. This interaction of the controls is considered desirable by some engineers, but on the other hand may so confuse the viewer that he may not consistently obtain optimum performance from the television receiver.

It has been found that on the average, if the viewer is not allowed to adjust any of the controls, a more satisfactory picture can be obtained. The reason for this statement may be illustrated by a simple example. Suppose the viewer turns up the contrast to compensate for low modulation. Next, suppose he later changes to a station that modulates fully and observes that the blacks are too dark and then turns up the brightness control. Under these conditions, if the scene next changes to one with high overall brightness, the receiver high voltage power supply could immediately overload and cause defocusing, blooming or, if the television receiver is a color set, the entire picture to turn to green.

Accordingly, it is an object of this invention to provide a novel and improved system for controlling the contrast and brightness of a cathode ray tube.

It has been determined that most viewers subjectively tend to operate a color television receiver with the contrast control normally adjusted to a point just below where spot blooming (i.e. defocusing of small areas of the picture) becomes objectionable. Also, most viewers subjectively tend to operate the color television receiver with the brightness control adjusted to a point where the high voltage supply for the kinescope ultor (anode) electrode does not become overloaded, and the entire raster defocused.

Current practice in color television receivers and color monitors using shadow-mask color kinescopes requires operating the kinescope at or near its maximum ratings for current high voltage power supply. A monitor or receiver operating this way can be easily overloaded and possibly damaged by the simple condition of applying excessive level of video signal to the kinescope. The possibility of a kinescope becoming damaged is increased because the viewer also tends to operate the set under conditions of maximum contrast and brightness control settings.

Accordingly it is another object of this invention to provide a novel and improved system for automatically operating a kinescope under conditions of maximum limits of brightness and contrast, that is: the system prevents the kinescope high voltage power supply from overloading and prevents spot blooming in the kinescope.

In accordance with one form of the invention two feedback loops are employed to control the peak-to-peak video and D.C. operating point of the kinescope and thus the contrast and brightness of the image reproducing device of a television reproducing system. Both feedback loops utilize the same error information, namely: one signal indicating overload of the kinescope ultor electrode high voltage supply; and another signal indicating a video signal having white peaks of amplitude sufficient to cause spot blooming. The presence of either of these signals of error information results in both the contrast and brightness of the reproduced picture to be reduced. With this system, it is feasible to operate a television receiver in one of three possible states, namely: maximum peak brightness limited only by spot blooming; maximum average brightness limited only by ultor power supply overload; or maximum system gain. Such system eliminates manual brightness and contrast controls on a television receiver and protects the high voltage power supply against overload.

A more detailed description follows in conjunction with the accompanying drawings, in which like reference numerals refer to like parts, in which.

Figure 1:
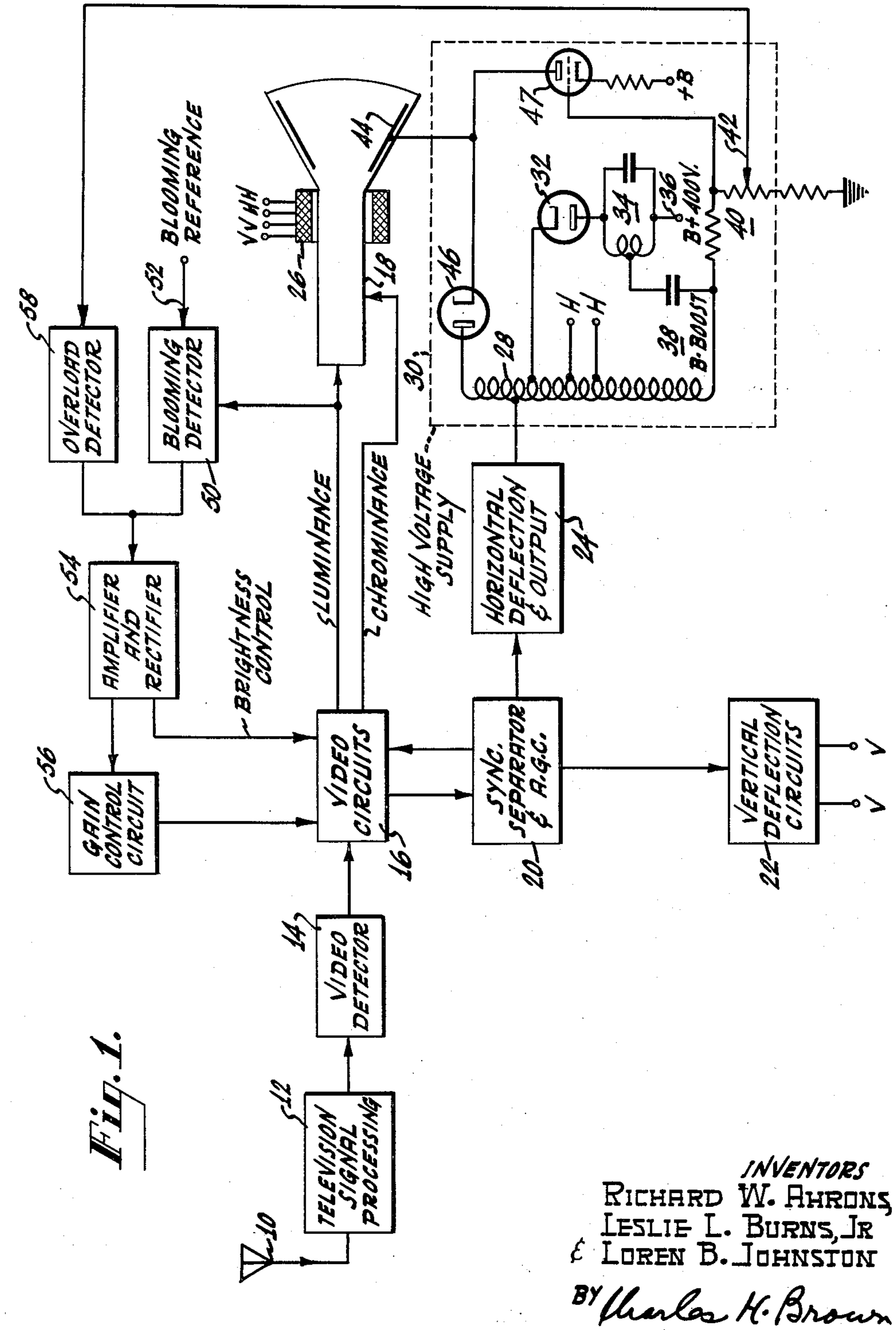
FIGURE 1 is a partial block diagram of a typical color television receiver where the automatic contrast and brightness control circuits of this invention are employed.

FIGURE 1, shows, by way of illustration only, a typical television receiver which may for example be similar to that described in "Practical Color Television for the Service Industry," published by RCA Service Company Incorporated, Camden, New Jersey, Second Edition, April 1954. In the alternative the receiver may be the same as that of the CTC7 chassis, the circuits and service data for which are available from RCA Service Company, Camden 8, New Jersey. While the specific form of the signal processing apparatus does not constitute a part of the invention, the showing of a suitable receiver is made to fully and clearly set forth the environment in which the invention may operate. The ground symbol has been omitted in the several blocks for the sake of clarity but may be assumed as present where needed to complete a circuit.

In FIGURE 1, a transmitted color television signal, received by an antenna 10, is applied to the input terminals of a signal processing section 12 of the television receiver. This signal processing section 12 may include the usual radio frequency, mixer, and intermediate frequency stages of a typical television receiver. In the alternative, the television receiver signal processing section 12 may be considered as the input of a composite color television signal from a suitable studio signal source. In this case, the remainder of the circuitry in FIGURE 1 would then be termed a color television monitor. The invention, as is described below, has equal utility with either a receiver or a monitor, monochrome or color. The color television receiver illustrated is by way of example only and not by way of limitation.

The output of the television signal processing section 12 is passed to a video detector 14 which detects the intermediate frequency signal from the processing section 12 to provide a composite black and white or color television signal as the case may be. In the instance of a color television receiver, as has been assumed, the composite color television signal from the video detector 14 is passed to the video circuits 16 which may include a luminance channel and a chrominance channel. In the chrominance channel, the chrominance signal portion of the composite signal is demodulated and matrixed to form the several red, green and blue color difference signals which are then applied to the respective guns of an image reproducing device or color kinescope 18.

The video circuits 16 also amplify the luminance and synchronizing pulses of the composite color television signal. The luminance signal, thus processed, is then applied to the red, green and blue guns of the color kinescope 18. The synchronizing components are passed from the video circuits 16 through a synchronizing signal (sync) separator and automatic gain control (AGC) circuit 20 which operates both to automatically control the gain of the television signal processing section 12 in a well known manner and also drive the vertical deflection circuits 22. In addition, the synchronizing components pass through the sync separator 20 and drive the horizontal deflection and output circuits 24. As is well known, the sync separator 20 also provides a keying pulse to the chrominance portion of the video circuit 16 to enable the color synchronizing burst to be separated from the composite color television signal in order that it might be used to control the demodulation of the chrominance signal and thus derive the red, green and blue color difference signals.

The color kinescope 18 includes a deflection yoke 26 having terminals VV for the vertical and HH for the horizontal windings of the yoke. The vertical deflection windings VV are coupled to the output terminals VV of the vertical deflection circuits 22.

The horizontal deflection and output circuits 24 drive a horizontal output transformer 28 of the high power voltage supply 30. The terminals HH of the horizontal deflection windings derive line frequency scanning waves from the output terminals HH of the horizontal output transformer 28 which is energized by a current supplied by the horizontal output tube in the horizontal output circuit 24. The horizontal output transformer 28 is of the auto-transformer type, the output of the horizontal output circuit being applied across a selected portion of the total series of windings and the horizontal deflection winding terminals HH being effectively coupled across a small segment of this portion. A conventional damper tube 32 has its cathode connected to the high voltage transformer 28 and has its anode connected by way of a LC circuit 34 to a point of fixed reference potential. In this case, the point of fixed reference potential is that of the plate or B+ supply circuit 36. The lower portion of the high voltage transformer 28 includes a conventional B-boost circut 38 which returns the lower end of the horizontal output transformer 28 through a resistance series voltage divider 40 to ground. The series voltage divider 40 includes a potentiometer 42, the arm of which provides a variable voltage related to the B-boost voltage which may be employed as the picture control voltage for adjusting the maximum brightness level of the kinescope, as will be described hereinafter. The B-boost voltage is essentially D.C., but has a 15,750 cycles per second (A.C.) component from the power supply superimposed thereon. The A.C. component usually appears parabolic in slope. When overload occurs, average B-boost decreases; thus B-boost contains information of ultor power supply overload.

The high voltage for the ultor electrode 44 of the kinescope 18 is provided by high voltage rectifier 46 whose anode is connected to the high potential terminal of the output transformer 28. The ultor electrode 44 is connected to the cathode of the high voltage rectifier 46. Also, shunt regulator tube 47 is coupled between said ultor electrode 44 and the supply voltage in a well known manner. The control electrode of the shunt regulator 47 is coupled to the B-boost voltage divider 40.

In accordance with the invention, a small amount of additional circuitry is added to a conventional receiver to reduce spot blooming and defocusing due to ultor power supply overload.

Basically, the invention may be considered as having two feedback loops, one of which acts in sensing overload of the kinescope ultor high voltage power supply and, in such event, reduces both the brightness and contrast of the reproduced image on the kinescope. The other acts in sensing white peaks in the video signal above the spot blooming level and reduces both contrast and brightness to prevent spot blooming from occurring on the kinescope.

The latter of these loops which may be termed the anti-blooming loop includes a simple high impedance diode circuit to sense any video peaks above the spot blooming level. The blooming signal from this sensing circuit is amplified, rectified and then applied to circuits which reduce the peak-to-peak video and D.C. bias applied to the kinescope so as to prevent kinescope spot blooming. Desirably, a proper choice of the anti-blooming circuit gain, time constant, and sensing point are made such that the net effect is to hold the peak brightness portion of a given scene just below the point where spot blooming begins.

Specifically, the luminance signal from the output of the video circuits 16 is passed through a blooming detector 50. The blooming detector 50 includes a bandwidth limiting circuit to limit the bandwidth of the incoming luminance signal in order to prevent the blooming detector 50 from setting up on impulse noise peaks extending in the white direction. The white peaks of the luminance signal, thus bandwidth limited, are then referred to a blooming reference voltage 52 by the blooming detector 50. Only the video peaks extending in the white direction that exceed this reference level are allowed to pass as a blooming error signal to the amplifier and rectifier circuit 54. The amplifier and rectifier circuit 54 amplifies and detects this blooming error signal which includes only the white peaks to provide a D.C. error voltage. This D.C. error voltage is applied to the video circuits 16 to vary the D.C. operating point of the final video amplifier stage and thus vary the brightness of the reproduced scene. The D.C. error signal from the amplifier and rectifier circuits 54 is also applied to a gain control circuit 56 which operates to control the gain of the final video amplifier and thus the contrast of the reproduced television image.

The overload sensing feedback loop uses the boosted B voltage derived from the B-boot circuit 38 of the high voltage power supply 30 as an indication of the average kinescope current. When a predetermined kinescope current is thus sensed, beyond which the high voltage power supply 30 would be overloaded, resulting in the raster becoming defocused, both the brightness and contrast of the reproduced image are reduced sufficiently to prevent overload of the high voltage power supply 30.

This circuit includes an overload detector 58 which receives an input signal, when the B-boost signal decreases because of ultor power supply overload, from the arm 42 of the series voltage divider 40 connected to the B-boost circuit 38. As previously mentioned, this B-boost voltage includes an alternating current component. This alternating current component which may be considered as an overload signal, is allowed to pass the overload detector 58 under conditions of overload of the high voltage power supply 30, in a manner similar to the white peaks from the blooming detector 50. The overload signal from the overload detector 58 is amplified and detected by the amplifier and rectifier 54 to provide a D.C. error voltage in a manner similar to that resulting from the blooming error signal. The D.C. error voltage acts both directly, and through the gain control circuit 56, to control both the gain and the D.C. operating point of the final video amplifier included in the video circuit 16. In this manner both the brightness and contrast of the reproduced image are reduced to prevent overload of the high voltage power supply 30.

To sum up the operation of the invention, the blooming detector develops a signal when the video at the output of the final video amplifier exceeds the blooming level. This blooming signal is amplified and then rectified as shown and then used to maintain both the brightness and the contrast at a maximum. This maximum condition, or operating point, is that point above which either spot blooming will occur or that point at which the television receiver is at maximum gain (and cannot be increased further). In addition to the signal from the blooming detector, a signal from the overload detector is applied to the input of the amplifier when overload occurs. This overload signal is treated just as is the blooming signal from the blooming detector and prevents overload of the ultor power supply by varying both the brightness and contrast. Thus the overload detector establishes a third limiting operating condition, namely that the television receiver is allowed to operate at maximum brightness and contrast, but is limited to that point above which the kinescope power supply would overload.

The operation of this automatic brightness and contrast control system may perhaps be more easily understood by a simple illustrative example. Since black level is a function of the system gain as well as of the video signal content, the effect of the automatic control system of this invention on black level will be considered. Initially, assume that an average brightness picture with full modulation is being received. The system gain has been designed to produce an acceptable picture and thus this condition corresponds to a certain blooming error signal from the blooming detector. Now if any of the following conditions occur, the blooming error signal will be reduced and the system gain will be increased: (*a*) reduction in magnitude of peak white in the scene, (*b*) reduction in percent modulation at the transmitter, (*c*) reduction in input to second video, (*d*) reduction in RF signal strength below AGC threshold, (*e*) aging of second video amplifier tube, and (*f*) increase in average scene brightness.

For the first five items in the list the gain loop tends to hold black level. For the sixth item the video gain loop tends to maintain the average brightness of the display. This operation results because the error signal is used to control the D.C. bias and video gain. Thus if the brightness is reduced, the contrast is similarly reduced. The reverse is also true.

Figure 2:
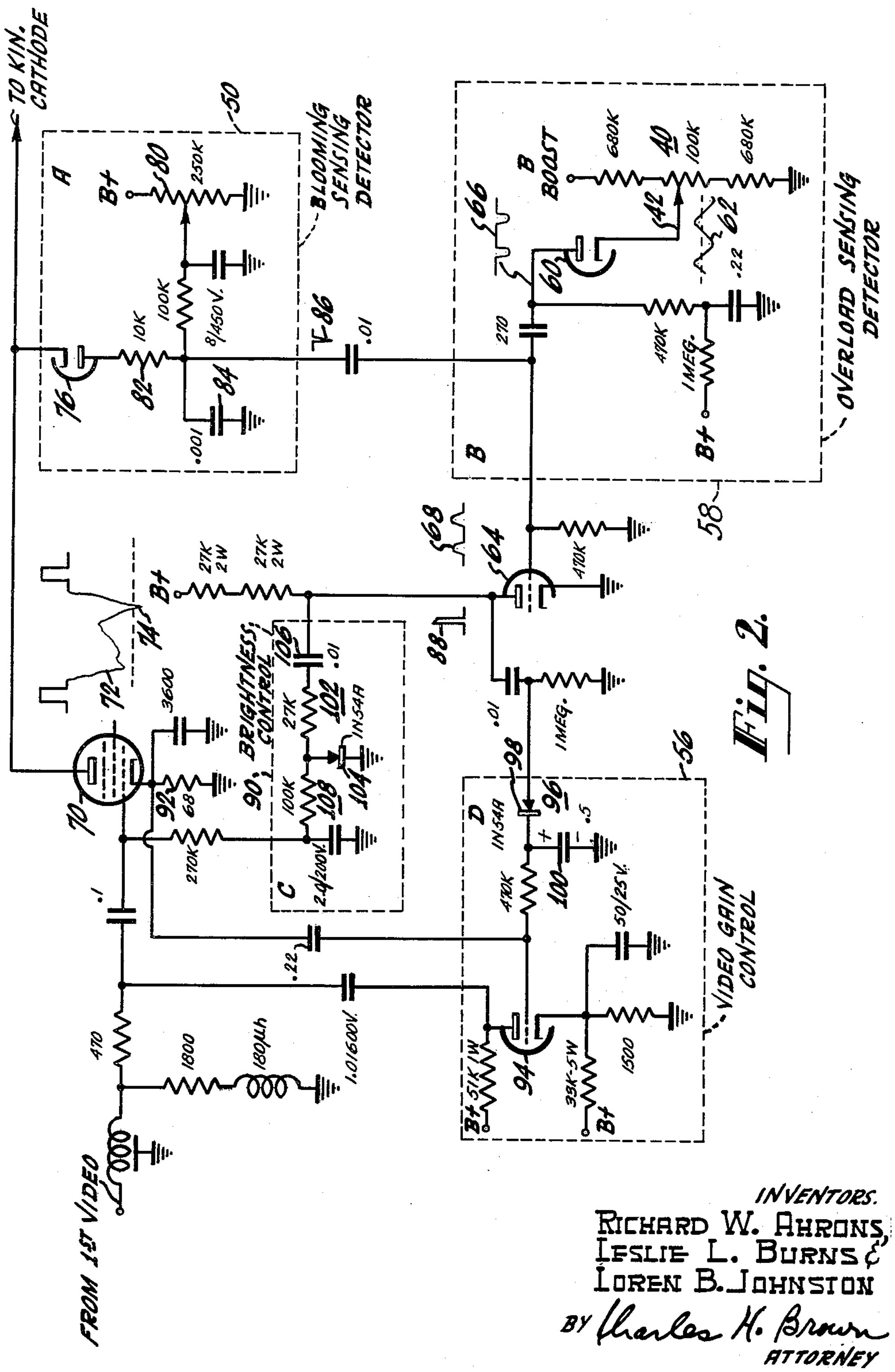
FIGURE 2 is a schematic diagram illustrating the circuit details of the two feedback loops of FIGURE 1.

In FIGURE 2, the details of a conventional color television receiver circuit (here the RCA CTC7 referred to above), modified to accommodate the teachings of the subject invention, are illustrated. In this figure only circuitry involving the two control loops are illustrated. The overload control loop begins with the overload sensing detector 58 in the lower right portion of FIGURE 2. In the overload sensing detector 58, a diode 60 is maintained in a normal cut off or nonconductive condition by the B-boost voltage from the high voltage power supply 30. With overload of the high voltage power supply, the B-boost voltage drops in value to a point at which the diode 60 becomes forward biased and thus conductive. The A.-C. ripple 62 which is present on the B-boost voltage is thus allowed to pass through the diode 60 to the input of an amplifier 64. This overload signal which is allowed to pass through the diode 60 is illustrated by the waveform 66 as including a sequence of negative going pulses of the A.-C. signal 62. The overload signal 66 is amplified by the common amplifier 64 to provide an amplified overload signal 68.

The blooming sensing detector 50 is connected to the output of the second video amplifier 70 which is included in the video circuits 16 (FIG. 1). The output of the second video amplifier 70 includes an amplified video signal illustrated by the waveform 72 having a peak 74 extending in the white direction. The blooming sensing detector 50 includes a diode 76 having its cathode connected to the plate of the video amplifier 70 so as to conduct on the negative going white peaks 74 extending below the blooming reference voltage as determined by the potentiometer 80. The potentiometer 80 controls a D.C. bias applied to the anode of the blooming detector 76. Also connected to the anode of the blooming detector diode 76 is a low pass RC filter including the resistor 82 and the capacitor 84. The RC filter reduces the video feed through due to the capacitance of the diode 76 and also minimizes the effect of high frequency noise. With the circuit constants of the values shown in FIG. 2 the automatic control system of this invention will hold a one quarter inch white vertical line at blooming level and yet will exhibit negligible set up on inpulse (very narrow) noise peaks. The blooming error signal output of the blooming sensing detector 50, as represented by the waveform 86, is passed to the input of the amplifier 64 which produces an amplified bloomng error signal 88. In this manner both the amplified blooming error signal 88 and the amplified overload error signals 68 are both passed through a brightness control circuit 90 to control the D.C. operating point of second video amplifier 70 and, through the video gain control circuit 56, to vary the video gain and thus the contrast of the reproduced picture.

In the operation of the video gain control circuit 56 (FIG. 1), a video signal is obtained from the cathode resistor 92 of the second amplifier 70, which video signal is in phase with that applied to the grid. This signal is amplified and inverted by a variable gain amplifier 94 and fed back to the grid of the second video amplifier 70 thereby cancelling a portion of the incoming video signal. Since the gain of the variable gain amplifier 94 is a function of its grid bias, the gain of the combination of the second video amplifier 70 and variable gain amplifier 94 is readily controlled by varying the D.C. voltage on the grid of the variable gain amplifier 94. The D.C. voltage on the grid of the variable gain amplifier 94 is determined by a detector circuit 96 which includes a diode 98 and a storage capacitor 100. Thus the positive going amplified blooming error signal 88 and/or the positive going amplified overload signal 68 are rectified by the diode 98 to provide a D.C. voltage which is stored by the capacitor 100 to thereby establish a D.C. voltage level at the grid of the variable gain amplifier 94.

Thus if either the blooming error signal or the overload signal increase in a positive going direction (indicating either white peaks that would cause spot blooming or too high average kinescope beam current), the voltage on the grid of the variable gain amplifier 94 becomes increasingly more positive. As this D.C. voltage on the grid of the variable gain amplifier 94 becomes more positive, its gain is increased thereby decreasing the gain of the video system.

The reverse is also true. If the white peaks in the video signal decrease such that spot blooming would no longer occur (or if the kinescope power supply is not overloaded), the voltage on the grid of the variable gain amplifier 94 becomes increasingly more negative. With this occurrence the gain of the variable gain amplifier 94 is reduced thereby increasing the gain of the video system until the white peaks of the video signal again reach that point at which spot blooming just begins to occur.

The cathode of the variable gain amplifier 94 is maintained sufficiently positive so that with zero volts on its grid the variable gain amplifier 94 is near cut off and the system gain is a maximum. A two to one change in system gain can be realized with a 15 volt bias change on the grid of the variable gain amplifier 94 with the circuit constants illustrated in FIG. 2 and tube type, 12AT7.

In a similar manner, the brightness control circuit 90 detects the amplified blooming error signal 88 (and in the event of overload of the kinescope power supply the amplified overload signal 68) by a detector 102 which includes a shunt diode 104 and a capacitor 106. The diode 104 acts as a shunt diode clamp to clamp the peaks of the amplified error signals 68 and 88 to ground. Thus clamped, the amplified error signals 68 and 88 pass to an integrator 108 and then directly to the control electrode of the signal video amplifier 70. The shunt diode 104 is used as a clamp because the signal applied to the common amplifier 64 is one having a low duty cycle having positive going peaks as illustrated. Using the shunt diode 104 a D.C. component is obtained which is relatively insensitive to changes in the duty cycle of the amplified error signals 68 and 88. In this manner, with an increase in the amplitude of the blooming error signal 86, the bias on the grid of the second video amplifier 70 is driven in a more negative direction. This increases the plate voltage of the second video amplifier which in turn decreases the average kinescope current to reduce the brightness of the reproduced image. Similarly, with a decrease in the amplitude of the blooming error signal, the bias on the grid of the second video amplifier 70 is driven in a more positive direction. This increases the brightness of the reproduced image.

By this blooming feedback circuit, the kinescope is made to operate at a brightness level determined by the setting of the blooming reference potentiometer. As previously described, this blooming reference potentiometer is desirably set such that the kinescope operates at the maximum possible level limited only by spot blooming. Thus the blooming reference potentiometer is set to that point above which spot blooming would occur.

Also if the kinescope power supply tends to overload, the overload error signal 66 increases in amplitude, thereby driving the bias on the grid of the second video amplifier 70 in a more negative direction. This, as described above, reduces the brightness of the reproduced image and continues until the overload condition no longer exists. From this it can be seen that the kinescope is allowed to operate at maximum brightness limited by ultor power supply overload.

It may again be noted that both the brightness and contrast are varied as a result of the variation of either the blooming error signal or the overload error signal.

There has been described a novel and improved television system that includes automatic provisions for maintaining the brightness and contrast of a reproduced television image at predetermined operating points which may be defined by three limiting conditions, namely, maximum peak brightness limited by spot blooming, maximum average brightness limited by ultor power supply overload, and maximum gain. The result is a unique system that makes maximum utilization of the inherent capabilities of a color television receiver. Also, the circuits of this invention find utility in either monochrome or color television receivers and monitors.

What is claimed is:

1. A television reproducing system comprising, in combination, a video amplifier for amplifying a video signal, said amplifier having an input circuit and an output circuit, an image reproducing device having a signal input electrode directly connected to said amplifier output circuit, a high voltage supply for said image reproducing device, overload detecting means for detecting overload of said high voltage supply and producing an overload signal representing said overload, additional detecting means for detecting white peaks in said video signal, brightness control means direct current coupled between each of said detecting means and said video amplifier input circuit for varying the direct current bias of said video amplifier and thus the direct current portion of said video signal, and variable gain control means coupled between each of said detecting means and said video amplifier input circuit for varying the gain of said video amplifier thereby to prevent overload of said high voltage supply and spot blooming in said image reproducing device.

2. An automatic brightness and contrast control circuit for a television reproducing system, comprising, in combination, a video amplifier for amplifying a video signal, said amplifier having an input circuit and an output circuit, a kinescope having a beam intensity controlling means direct current connected to said amplifier output circuit and an anode electrode, a high voltage power supply for said kinescope coupled to said anode electrode, said high voltage power supply including a circuit for obtaining B-boost voltage that is proportional to the average beam current in said kinescope, said B-boost voltage having an alternating current ripple signal superimposed thereon, overload detecting means responsive to said B-boost voltage level for detecting overload of said high voltage power supply, said overload detecting means operating to pass varying portions of said alternating current ripple signal as an overload signal in an amount proportional to the degree of overload of said high voltage power supply, blooming detecting means including means for passing only the peak white portions of said video signal that would tend to cause blooming in said kinescope to constitute a blooming error signal, a common amplifier having an input circuit coupled to said overload detecting means and to said blooming detecting means and an output circuit for amplifying said overload signal and said blooming signal, brightness control means direct current coupled between said common amplifier output circuit and said video amplifier input circuit for varying the direct current bias of said video amplifier and thus the direct current bias of said kinescope beam intensity controlling means as a function of said overload and blooming signals, and video gain control means coupled between said common amplifier output circuit and said video amplifier input circuit for varying the gain of said video amplifier as a function of said overload and said blooming signals, thereby to prevent overload of said high voltage supply and spot blooming in said kinescope.

3. The automatic brightness and contrast control circuit set forth in claim 2 wherein said blooming detecting means includes a diode having a cathode coupled to the output circuit of said video amplifier and an anode coupled to the input circuit of said common amplifier, and means coupled to said diode anode for biasing said diode to cut off for all values of video signal in the output circuit of said video amplifier below the blooming level of said kinescope, and said overload detecting means including a diode coupled between said B-boost circuit and the input circuit of said common amplifier, said B-boost circuit operating to maintain said diode in a nonconducting condition in the absence of kinescope overload and in a conducting condition to allow said alternating current ripple signal to pass to the input circuit of said common amplifier in the event of overload.

4. The automatic brightness control and contrast circuit as set forth in claim 3 wherein said variable gain control means includes a variable gain control amplifier having an output circuit coupled to said video amplifier input circuit and an input circuit, said video amplifier including means for deriving an output video signal that is in phase with the video signal applied to the input circuit of said video amplifier, said variable gain control amplifier input circuit being coupled to said in phase video signal deriving means, and detecting means coupled to the output circuit of said common amplifier for varying the bias of said variable gain control amplifier as a function of the amplified blooming and overload signals.

5. The automatic brightness and contrast control circuit set forth in claim 4 wherein said brightness control means includes a detecting circuit coupled to the output circuit of said common amplifier for providing a direct current signal having an amplitude that is proportional to said overload signal and to said blooming signal whereby the brightness and contrast of an image appearing on said kinescope is maintained at a maximum without causing spot blooming of said kinescope or overload of said kinescope high voltage power supply.

6. A television reproducing system comprising, in combination, a video amplifier for amplifying a video signal, said amplifier having an input circuit and an output circuit, an image reproducing device having a signal input electrode directly connected to said amplifier output circuit, a high voltage supply for said image reproducing device, overload detecting means for detecting overload of said high voltage power supply and for producing an overload signal representing said overload, a common amplifier having an input circuit coupled to said overload detecting means and an output circuit for amplifying said overload signal, brightness control means direct current coupled between said common amplifier output circuit and said video amplifier input circuit for varying the direct current bias of said video amplifier and thus the brightness of the image reproduced by said imagee reproducing device to prevent overload of said high voltage power supply, and video gain control means coupled between said common amplifier output circuit and said video amplifier input circuit for varying the gain of said video amplifier to reduce the contrast of image produced by said image reproducing device thereby to prevent overload of said high voltage power supply.

7. A color television reproducing system comprising, in combination, a video amplifier for amplifying a luminance signal, said amplifier having an input circut and an output circuit, a color kinescope having cathode electrodes directly connected to said amplifier output circuit, a high voltage supply for said kinescope, blooming detecting means for detecting white peaks in said luminance signal that would cause spot blooming of said kinescope thereby to provide a blooming error signal, a common amplifier having an input circuit coupled to said blooming detecting means and an output circuit for amplifying said blooming signal, brightness control means direct current coupled between said amplifier output circuit and said video amplifier input circuit for varying the direct current bias of said video amplifier and thus the brightness of the image reproduced by the kinescope as a function of said blooming thereby to prevent spot blooming of said kinescope, and video gain control means coupled between said amplifier output circuit and said video amplifier and said video amplifier input circuit for varying the gain of said video amplifier as a function of the blooming of said video signal thereby to vary the contrast of the image reproduced by said kinescope to prevent spot blooming.

8. A color television reproducing system comprising, in combination, a video amplifier for amplifying a luminance signal, said amplifier having an input circuit and an output circuit, a color kinescope having cathode electrodes directly connected to said amplifier output circuit, a high voltage supply for said kinescope, overload detecting means for detecting overload of said high voltage supply and producing an overload signal representing said overload, blooming detecting means for detecting white peaks in said video signal that would cause blooming of said image reproducing device to provide a blooming error signal, a common amplifier having an input circuit coupled to said overload detecting means and to said blooming detecting means and an output circuit for amplifying said overload signal and said blooming signal, brightness control means direct current coupled between said common amplifier output circuit and said video amplifier input circuit for varying the direct current input bias of said amplifier and thus the direct current portion of said video signal to prevent overload of said high voltage power supply and blooming of said kinescope, and video gain control means coupled between said common amplifier output circuit and said video amplifier input circuit for varying the gain of said video amplifier to prevent overload of said high voltage supply and blooming in said kinescope.

References Cited in the file of this patent

UNITED STATES PATENTS

| | | |
|---|---|---|
| 2,672,505 | Schwarz | Mar. 16, 1954 |
| 2,698,358 | Hoyt | Dec. 28, 1954 |
| 2,832,824 | Oakley | Apr. 29, 1958 |

FOREIGN PATENTS

| | | |
|---|---|---|
| 548,485 | Belgium | Oct. 1, 1956 |